US006822652B1

(12) United States Patent
Browne et al.

(10) Patent No.: US 6,822,652 B1
(45) Date of Patent: Nov. 23, 2004

(54) METHOD AND APPARATUS FOR PARAMETRIC VARIATION OF TEXT

(75) Inventors: Cameron Bolitho Browne, Burleigh Heads (AU); Paul Quentin Scott, Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/384,432

(22) Filed: Aug. 27, 1999

(30) Foreign Application Priority Data

Sep. 9, 1998 (AU) .............................................. PP5790

(51) Int. Cl.[7] .............................................. G06T 11/00
(52) U.S. Cl. ........................ 345/470; 345/467; 345/619
(58) Field of Search ................................ 345/619, 433, 345/420, 467–472, 418, 441; 382/301, 187, 298, 293

(56) References Cited

U.S. PATENT DOCUMENTS

| | | | | |
|---|---|---|---|---|
| 5,175,811 A | * | 12/1992 | Sone et al. ................... | 345/469 |
| 5,280,577 A | * | 1/1994 | Trevett et al. ............... | 345/469 |
| 5,299,299 A | * | 3/1994 | Ohuchi ........................ | 345/426 |
| 5,644,656 A | * | 7/1997 | Akra et al. .................. | 382/215 |
| 5,652,804 A | * | 7/1997 | Bronstein et al. ............ | 382/141 |
| 5,710,880 A | * | 1/1998 | Howlett et al. .............. | 345/468 |
| 5,841,902 A | * | 11/1998 | Tu .............................. | 382/187 |
| 5,872,573 A | * | 2/1999 | Adegeest ..................... | 345/621 |
| 5,936,628 A | * | 8/1999 | Kitamura et al. ............ | 345/420 |
| 6,100,893 A | * | 8/2000 | Ensz et al. ................... | 345/420 |
| 6,215,501 B1 | * | 4/2001 | Takita ......................... | 345/581 |
| 6,331,861 B1 | * | 12/2001 | Gever et al. ................. | 345/626 |
| 6,542,157 B1 | * | 4/2003 | Browne ....................... | 345/441 |

FOREIGN PATENT DOCUMENTS

| | | |
|---|---|---|
| AU | 199884252 B2 | 9/1998 |
| AU | 199891390 B2 | 11/1998 |
| AU | 199922490 B2 | 3/1999 |

OTHER PUBLICATIONS

IBM Technical Disclosure, Fast Method to Compute Medial Axis and Related Transforms, Dec. 12, 1991, pp. 1–5.*
C. Pickover, "Computers, Pattern, Chaos and Beauty, Graphics From an Unseen World", St. Martin's Press, New York, pp. 332–337.
Rafael C. Gonzalez, et al., *Digital Image Processing*, Addison–Wesley Publishing Company, Inc., 1992.

\* cited by examiner

*Primary Examiner*—Matthew C. Bella
*Assistant Examiner*—Anthony Blackman
(74) *Attorney, Agent, or Firm*—Fitzpatrick, Cella, Harper & Scinto

(57) ABSTRACT

The present invention discloses a method, apparatus and computer program product for positioning a plurality of sub-images such as spheres or circles within a bounded image (such as a character). The size (eg radius) and/or packing density of the sub-images can be varied in accordance with the distance of a point where the sub-image is to be located from a reference line (131, 171) which can be internal or external of the bounded image. The use of actual and virtual dimensions ($r_a$, $r_v$) enables overlapping and spaced apart sub-images to be created. A threshold test is also able to prevent display of sub-images below a certain size.

36 Claims, 16 Drawing Sheets

METHOD AND APPARATUS FOR PARAMETRIC VARIATION OF TEXT

FIELD OF THE INVENTION

The present invention relates to computer graphics and, in particular, to creating a bounded image including a number of sub-images. Although the present invention finds particular application to the creation of computer fonts in which the boundary is the exterior of a character, the invention is not limited thereto and also finds application in the printing of large scale images on substrates such as textiles paper, sheet polymers and the like.

The preferred embodiment of the present invention discloses a method of packing circles in arbitrary regions where packing density and properties of component circles are subject to variation according to their position with respect to reference objects (eg points, lines or curves) or goals.

BACKGROUND OF THE INVENTION

In the field of computer graphics it is often desirable to decorate or enhance given shapes to make them more visually interesting, eg for the purposes of advertising or web page design. This is done by adding texture to the region defined by a shape, such as filling the region with multiple instances of smaller objects, resulting in a more complex composite image. Circle packing provides such a texture.

Traditional circle packing methods obey the following general conditions:

(a) the packing is reasonably dense and evenly distributed across the region, (b) circles are positioned so as to give the impression of random placement and avoid noticeable locally repeating patterns, (c) circles do not intersect neighbouring circles, (d) circles are tangential to and touching their nearest neighbours, (e) the packing is obsculatory, ie any available area is always covered by the largest possible circle.

The simplest prior art method of circle packing is the random placement of circles within the region. This is inefficient and does not satisfy conditions (a), (c), (d) or (e) above.

Apollonian packing is also known. This is achieved by placing at random unfilled points within the region, the largest circle that touches at least three other circles. It satisfies all of the above conditions but does not allow control over properties of the individual circles, whose diameters are defined deterministically.

The related 1-tangent method (Pickover C. 1990, "Computers, Pattern, Chaos and Beauty". St Martin's Press, New York, p 332–6) is a prior art method which relaxes the condition that the filling circle touch at least three neighbours, and requires only that the filling circle touch at least 1 neighbour. This method is more efficient than Apollonian packing, satisfies all of the above conditions except (e), and does not necessarily result in a deterministic packing. However, again 1-tangent packing does not provide control over properties of individual circles.

DISCLOSURE OF THE INVENTION

The object of the present invention is to create such composite images from sub-images within a boundary (the sub-images not being restricted to circles) but for aesthetic reasons to relax the above general conditions and/or to provide a spatial relationship followed by a parameter of the sub-images within the image boundary.

For example, to further enhance the artistic effect it is often desirable to manipulate the packing density or properties of component circles dependent on their position with respect to reference objects or goals. For instance, it may be desired to vary the size of circles so that they increase in diameter in accordance with their vertical position, or to vary the density of the circles so that they are more densely packed towards tile centre of the boundary.

The existing techniques are limited in that although they address the problem of even-distribution packings within a space, they do not provide for further manipulations of density or properties of components such as circles that the user may wish to apply. Given the computational nature of these algorithms, it is desired that such manipulations occur with a minimum of interaction from the user, but that the user also have reasonably precise control over the final result.

In accordance with one aspect of the present invention there is disclosed a method of creating a bounded image from a plurality of sub-images, said method comprising the steps of:

(1) defining a boundary for said image, (2) specifying parameters of each said sub-image, and (3) creating said sub-images within said boundary whilst maintaining a spatial relationship of at least one parameter within said boundary.

In accordance with a second aspect of the present invention there is disclosed an apparatus for creating a bounded image from a plurality of sub-images, said apparatus comprising:

first means to define a boundary for said image, second means to specify parameters for each said sub-image, and third means to create sub-image within said boundary whilst maintaining a spatial relationship of at least one parameter within said boundary.

In accordance with a third aspect of the present invention there is disclosed a computer program product for creating a bounded image from a plurality of sub-images, said product comprising:

first means to define a boundary for said image, second means to specify parameters for each said sub-image, and third means to create sub-images within said boundary whilst maintaining a spatial relationship of at least one parameter within said boundary.

In accordance with a fourth aspect of the present invention there is disclosed a bounded image having a plurality of sub-images and being formed by any of the first, second or third aspects.

BRIEF DESCRIPTION OF THE DRAWINGS

Some embodiments of the present invention will now be described with reference to the drawings in which.

DETAILED DESCRIPTION

In the preferred embodiment, a method is provided for packing circles within bounded regions of arbitrary shape where packing density and properties of component circles are subject to variation according to their position with respect to reference objects or goals. Reproducibility can be guaranteed if required.

Although the principles of the preferred embodiment have general applicability to arbitrarily shaped 2-dimensional regions defined by a set of closed curves, and may be extended without major modification to n-dimensional regions, the preferred embodiment in describes the method in terms of 2-dimensional regions that describe character shapes.

Figure 1:
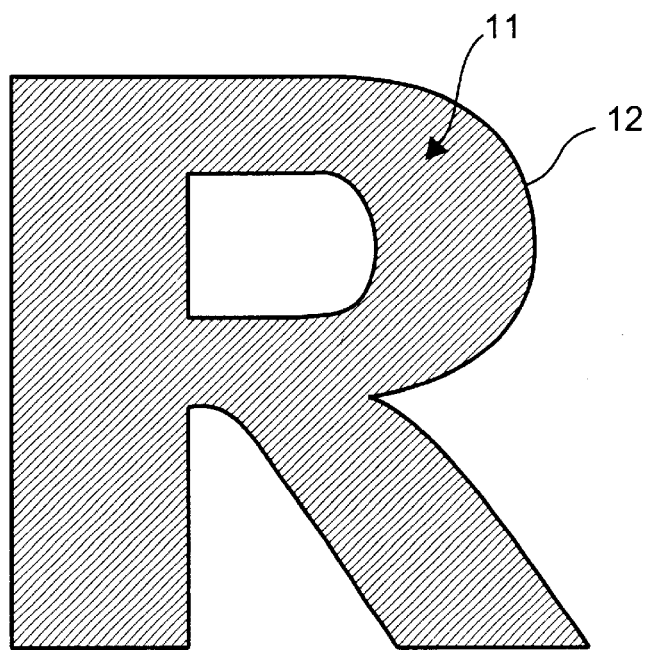
FIG. 1 illustrates a closed region defined by a set of outline curves.

FIG. 1 illustrates a typical 2-dimensional region 11 formed into the character R defined by a set of closed 2-dimensional outline curves 12. That the region defies a character shape is only by way of example. The region 11 could simply be a rectangle in the case of a textile pattern.

Figure 2:
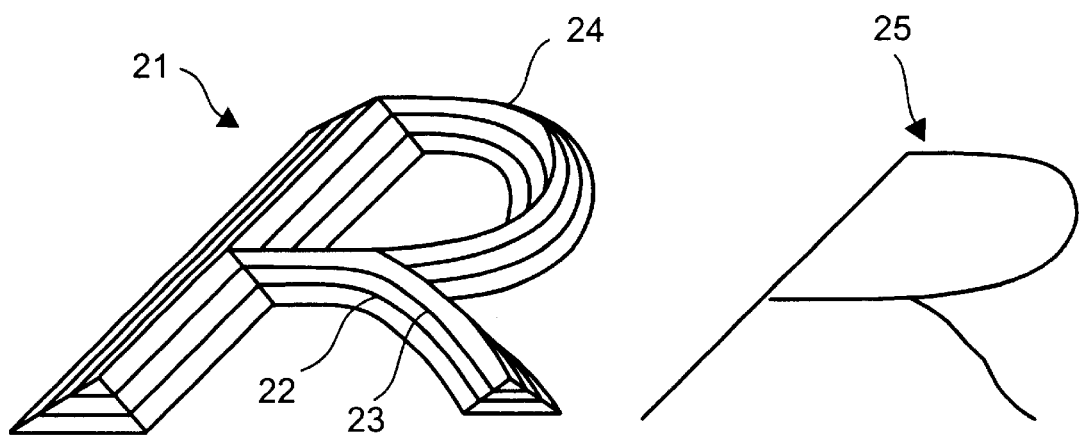
FIG. 2 is a perspective view of the Euclidean distance map (EDM) and medial axis transform (MAT) of the closed region.

FIG. 2 shows a perspective view of the Euclidean distance map (EDM) 21 of R, with internal points elevated according to their distance from the outline 12. Contours 22, 23 on the EDM are shown to demonstrate the principle of the EDM, and the ridge 24 of the EDM is also shown. The ridge 24 can be converted directly to a set of curves that describe the medial axis transform (MAT) 25 of the region 11. Techniques of determining the EDM and MAT are standard image processing algorithms and are well documented elsewhere (eg Gonzales & Woods "Digital Image Processing" or any image processing textbook). The Euclidean distance map is used in the preferred embodiment, however, any suitable distance metric can be used in practice. The MAT need not necessarily be derived from the EDM, and can be derived independently, and need only be generated if necessary: if the user selects a packing variation that does not require the MAT it need not be generated.

Figure 3:
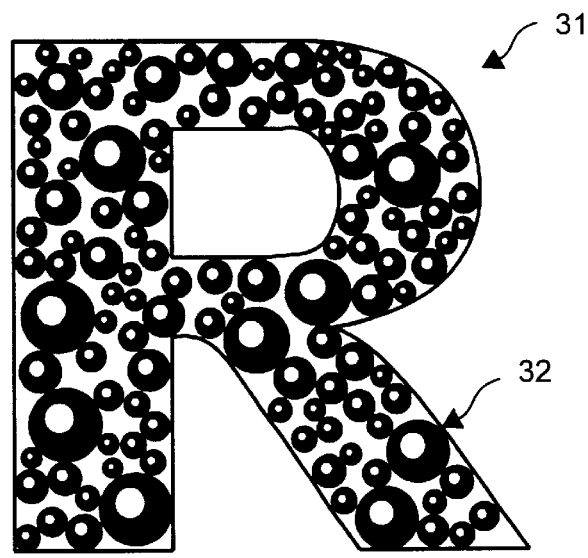
FIG. 3 illustrates a typical prior art circle packing of R.

Turning now to FIG. 3 there is shown the result of circle packing the region R 31 without position dependent variation. This result is similar to the result that would be achieved with the standard 1 tangent technique. Notice that each circle 32 is tangential with at least one neighbour 32, and that packing conditions (a), (b), (c), (d) above are satisfied, but that condition (e) is not satisfied, i.e. the packing is not necessarily obsculatory.

Figure 4:
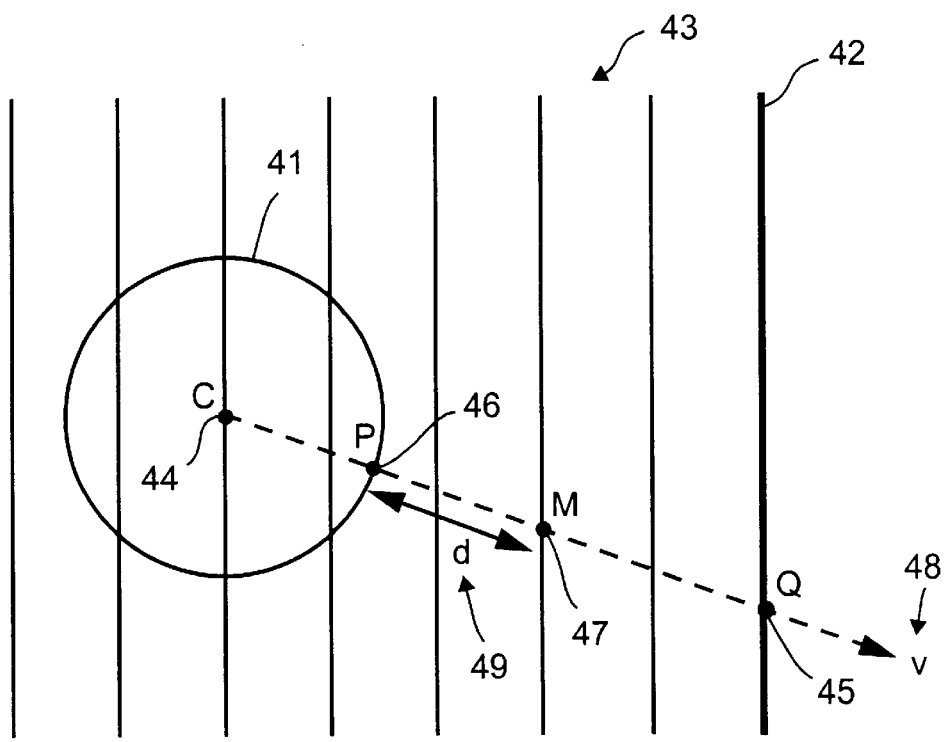
FIG. 4 illustrates how in an initial embodiment the radius of tangential circles is constrained by their proximity to a line.

FIG. 4 demonstrates the principle of tangential packing in accordance with a first embodiment. A circle 41 with centre C 44 exists within the region R relative to the outline 42. Contour lines 43 radiating inward from 42 indicate distance from 42 within R. A random direction is chosen indicated by the vector v 48 radiating from C. The vector v intersects the circle 41 at point P 46 and intersects line 42 at the point Q 45. The point M 47 mid way between P and Q is selected, and is adjusted along the line PQ towards P until M is a suitable centroid for a neighbouring circle. M is a suitable centroid for a new circle if the distance d 49 between M and P is less than or equal to the distance from M to Q (deduced directly from the EDM). Once the distance d has been determined, a new circle of radius d and centred at point M is created, which is tangential to the circle 41.

Figure 5:
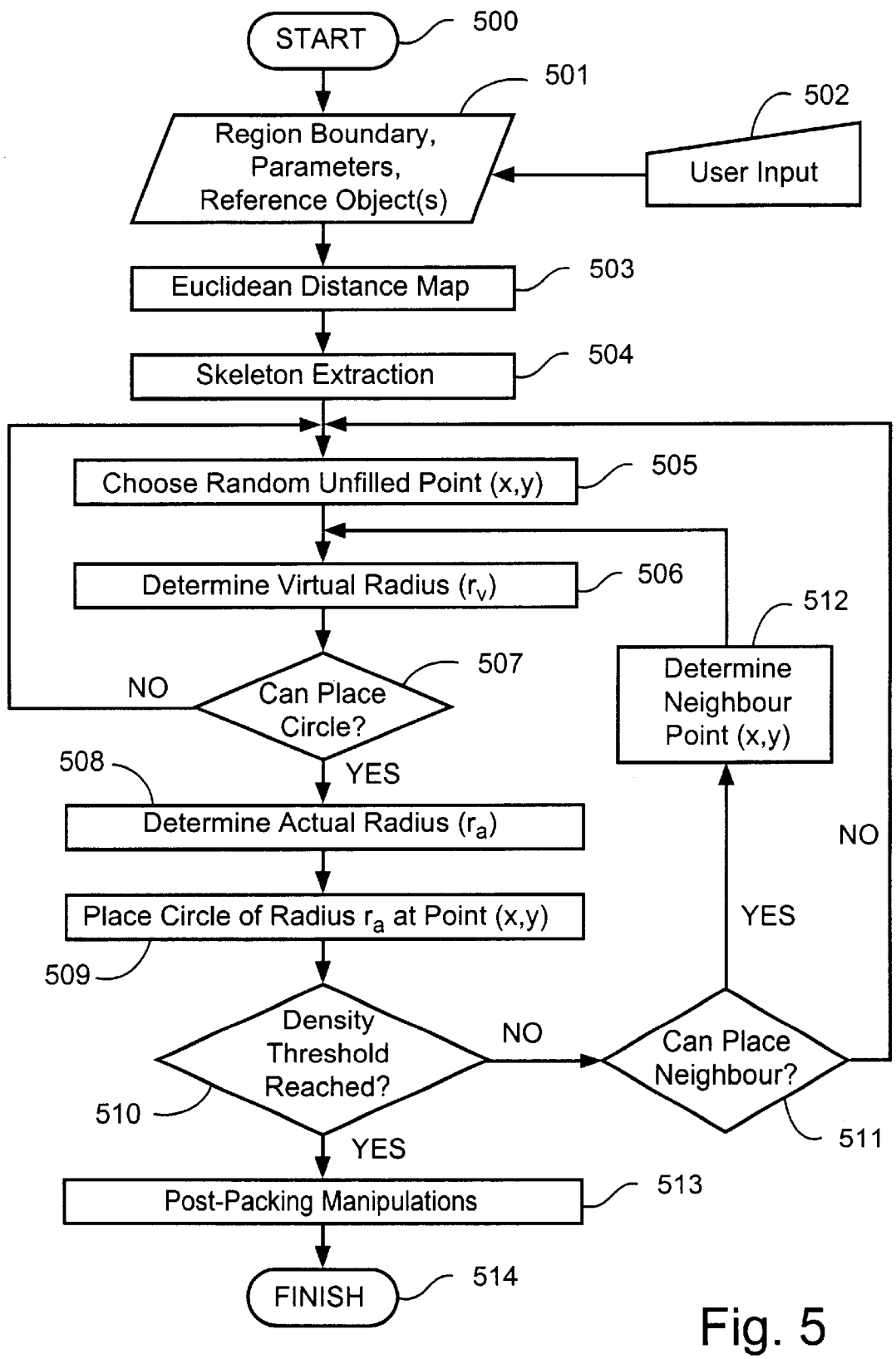
FIG. 5 is a flow diagram describing the preferred overall method of circle packing with position-dependent variation.

Turning now to FIG. 5, there is illustrated a flow diagram of the preferred method for packing circles in arbitrary regions where packing density and properties of component circles are subject to variation according to their position with respect to reference objects or goals. The preferred method is described with reference to examples consisting of 2-dimensional regions described by closed outline curves that describe character shapes. However, the principles of this invention have general applicability to arbitrarily shaped n-dimensional regions and the invention is not limited to 2-dimensional cases.

In initial step 500 of the proposed method, the process commences, and the following information 501 is input by the user 502:

(a) a set of closed 2-dimensional curves that describe a region. Specifically, FIG. 1 illustrates a character glyph of a font described by its outline, and its filled interior region.

(b) parameters that affect the final packing result. These parameters can include (but are not limited to) the size range between which circle radii can vary, a preferred direction, a packing density threshold, a measure of allowed overlap between neighbouring circles, a minimum radii threshold below which circles are deleted, etc, and (c) one or more reference objects that govern the position-dependent variation. These objects can include (but are not limited to) points, line segments, lines, the set of outline curves, the MAT, an arbitrary curve or set of curves, etc.

In step 503, the Euclidean distance map (EDM) of the closed region is determined. If the region's medial axis transform (MAT) is required for position-dependent variation then it is extracted directly from the EDM in step 504, otherwise the MAT is not generated. This concludes the pre-packing steps (500 to 504) that must occur before packing takes place.

The next step 505 is the first step of the packing loop (505 to 512). A random point P within the closed region R is chosen. If P is already covered by an existing circle. or if the EDM distance value for P is below the minimum allowed circle radius then another random point is chosen. This process continues until either a suitable point P is found, or a predefined number of iterations is reached, in which case the packing loop terminates and step 513 is performed.

In step 506 a virtual radius $r_v$ is determined. The virtual radius is the radius used for packing but is not necessarily the final radius of the circle. This radius $r_v$ embodies density variation and is determined by: the EDM distance at P, the packing density and overlap parameters, and the position of P relative to the reference object(s).

In decision block 507 a check is made as to whether a circle centred at P with radius $r_v$ call be added to the packing without violating the conditions defined by the user's choice of parameters. If decision block 507 returns false (No), then processing returns to step 505 and a new random point P is chosen. Otherwise processing continues to step 508.

In step 508 the virtual radius $r_v$ is converted to a corresponding actual radius $r_a$ that is then assigned to be the circle's radius. The actual radius $r_a$ embodies both density and size variation and is determined by: the EDM distance at P, packing density and overlap parameters, and the position of P relative to the reference object(s). The actual radius $r_a$ can be further adjusted in the post-packing steps.

In step 509 a circle centred at point P with radius $r_a$ is added to the packing and the relevant data structures are updated.

In decision block 510 a check is made as to whether the area covered by the existing, circles as a percentage of the total area enclosed by R is greater than or equal to a density threshold specified by the user. If the decision block 510 returns false (No), then processing continues to decision block 511 and the packing loop continues. Otherwise the packing loop terminates and processing continues to step 513.

In decision block 511 a check is made to determine whether a new neighbouring circle can be placed tangential with the circle most recently created. This process continues until either it is determined that a tangential neighbour can be placed, or a predefined number of iterations is reached, in which case the packing loop terminates and step 513 is performed. If decision block 511 returns false (No) then processing returns to step 505 at the start of the packing loop, and a new random point is chosen. Otherwise processing continues to step 512.

Step 512 determines the point that is the centroid of the neighbouring tangential circle whose existence was proven by decision block 511. This point is passed on and processing returns to step 506.

Step 513 is the first of the post-packing steps (513–514). In step 513 post-packing manipulations are applied to the packed circles. This can include, but is not limited to, varying the actual radii $r_a$ of circles based on their proximity to the reference object(s).

In step 514 the process terminates. The circle packing is now complete, and can be displayed on a monitor, printed, and/or passed on as data for further processing by other programs.

Figure 6:
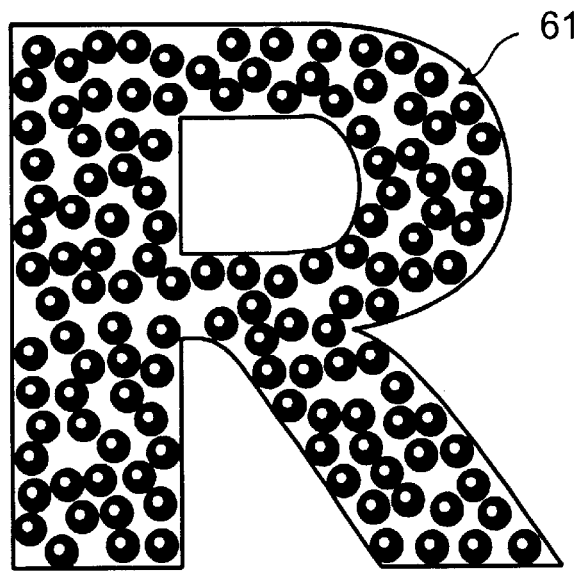
FIG. 6 illustrates a circle packing of the closed region with fixed radius circles.

FIG. 6 shows a tangential packing of circles 61 with equal radius in accordance with the process of FIG. 5. This results in a different style of packing that is less dense than 1-tangent packing and is most definitely not obsculatory.

Figure 7:
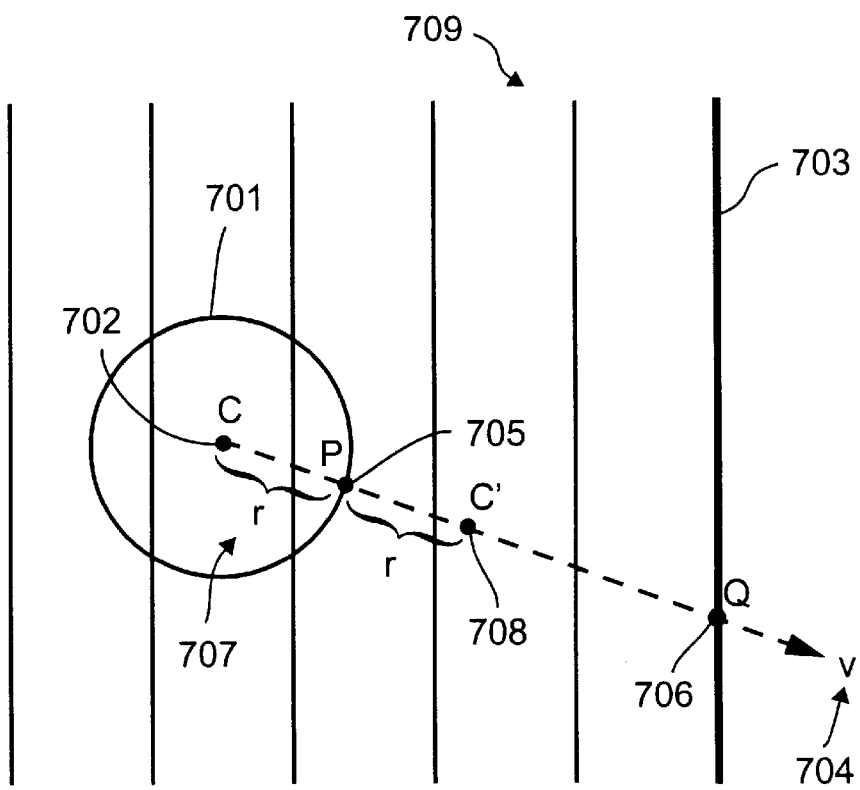
FIG. 7 illustrates the clamping of tangential radii.

This preferred method of performing tangential packing is achieved as explained in FIG. 7. A circle 701 with centre C 702 and radius r 707 exists within the region R relative to the outline or boundary 703. Contour lines 709 radiating inward from the boundary 703 indicate distance from the boundary within R. A random direction is chosen indicated by the vector v 704 radiating from C. The vector v intersects C at point P 705 and intersects the boundary 703 at the point Q 706. The point C' 708 lies on the line PQ a distance r from P, and is the candidate for a neighbouring tangential circle with radius equal to the radius of C. If the distance from C' to the boundary 703 (deduced directly from the EDM) is less than or equal to r then the neighbouring circle can be placed, else it is discarded.

Figure 8:
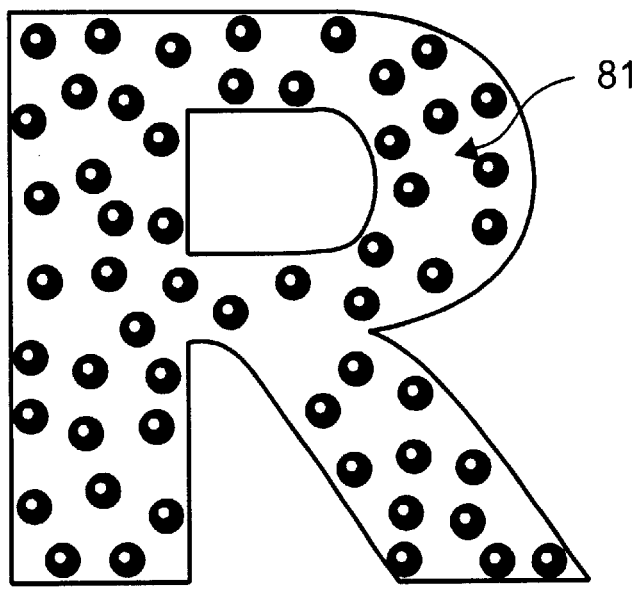
FIG. 8 illustrates a uniform decrease in density across the object.
Figure 9:
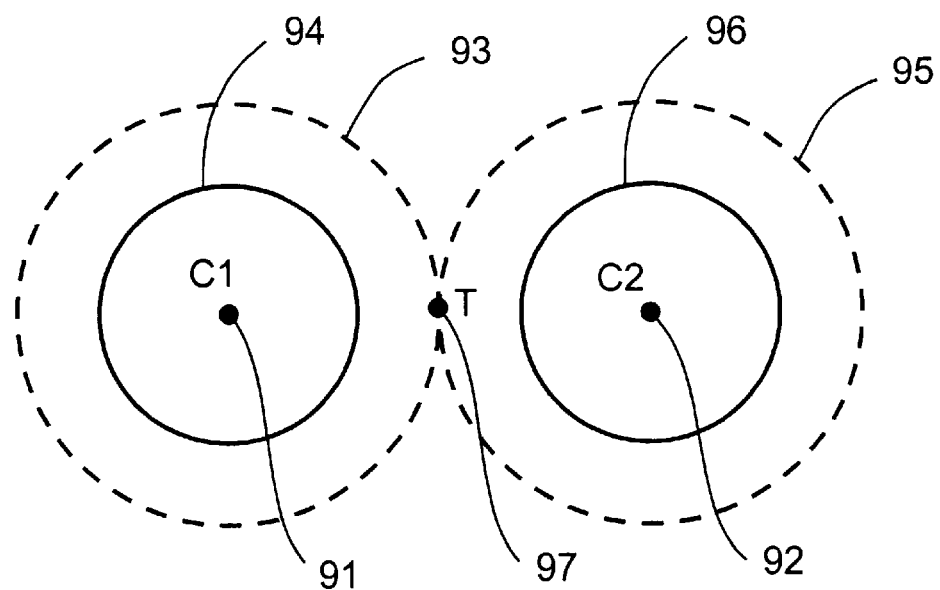
FIG. 9 illustrates virtual radii and actual radii resulting in decreased density.

Turning now to FIG. 8 there is shown a circle packing with uniformly decreasing packing density 81. This is achieved by assigning each circle a different virtual and actual radius as explained in FIG. 9. Given two neighbouring tangential circles C1 91 with virtual radius $r_{v1}$ 93 and actual radius $r_{a1}$ 94, and C2 92 with virtual radius $r_{v2}$ 95 and actual radius $r_{a2}$ 96, it is seen that the circles are tangential on their virtual radii which touch at the point T 97. This is because packing is performed on the virtual radii as described in steps 506 and 507 of the circle packing loop of FIG. 5. In the case of FIG. 9 the actual radii are less than the virtual radii, resulting in a less dense packing.

Figure 10:
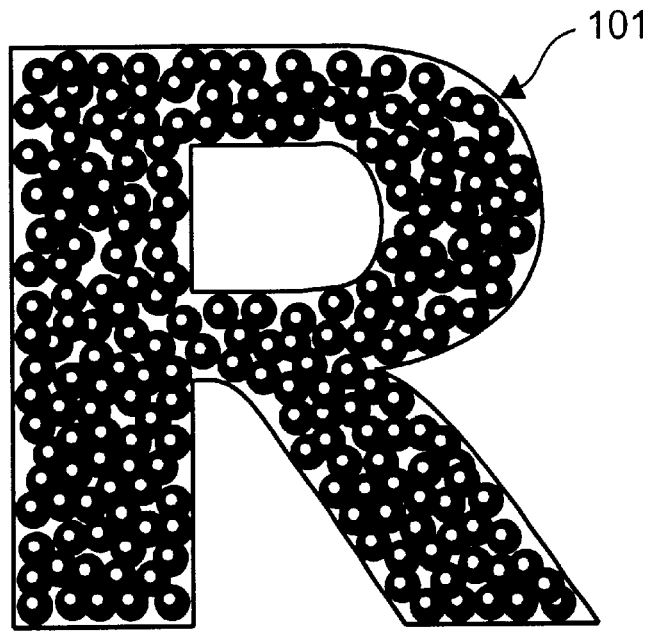
FIG. 10 illustrates uniform increase in density across the object and corresponding neighbour overlap.
Figure 11:
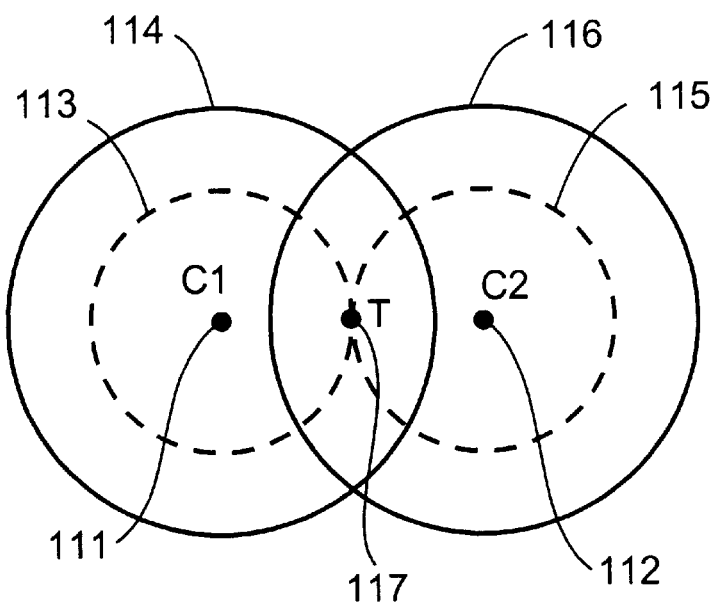
FIG. 11 illustrates virtual radii and actual radii resulting in increased density and overlap.

FIG. 10 shows a circle packing with uniformly increased packing density 101 and the resulting intersection between neighbouring circles. This is achieved by assigning each circle a different virtual and actual radius as illustrated in FIG. 11. Given two neighbouring tangential circles C1 111 with virtual radius $r_{v1}$ 113 and actual radius $r_{a1}$ 114, and C2 112 with virtual radius $r_{v2}$ 115 and actual radius $r_{a2}$ 116, it is shown that the circles are tangential on their virtual radii which touch at the point T 117. This is because packing is performed on the virtual radii as described in steps 506 and 507 of the circle packings loop of FIG. 5. In the case of FIG. 11 the actual radii are greater than the virtual radii, resulting in a denser packing and overlap of circles. This conflicts with packing conditions (c) and (d) but is allowed as it is often desired as an artistic effect.

Figure 12:
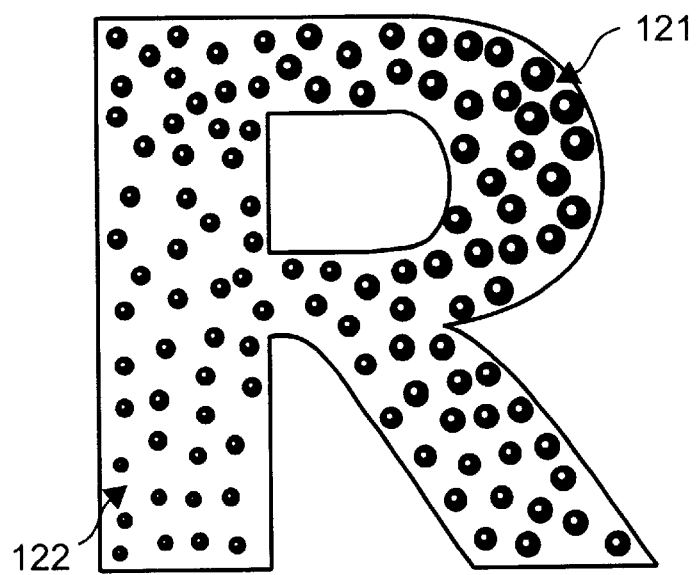
FIG. 12 illustrates size variation dependent on distance from a reference line L.
Figure 13:
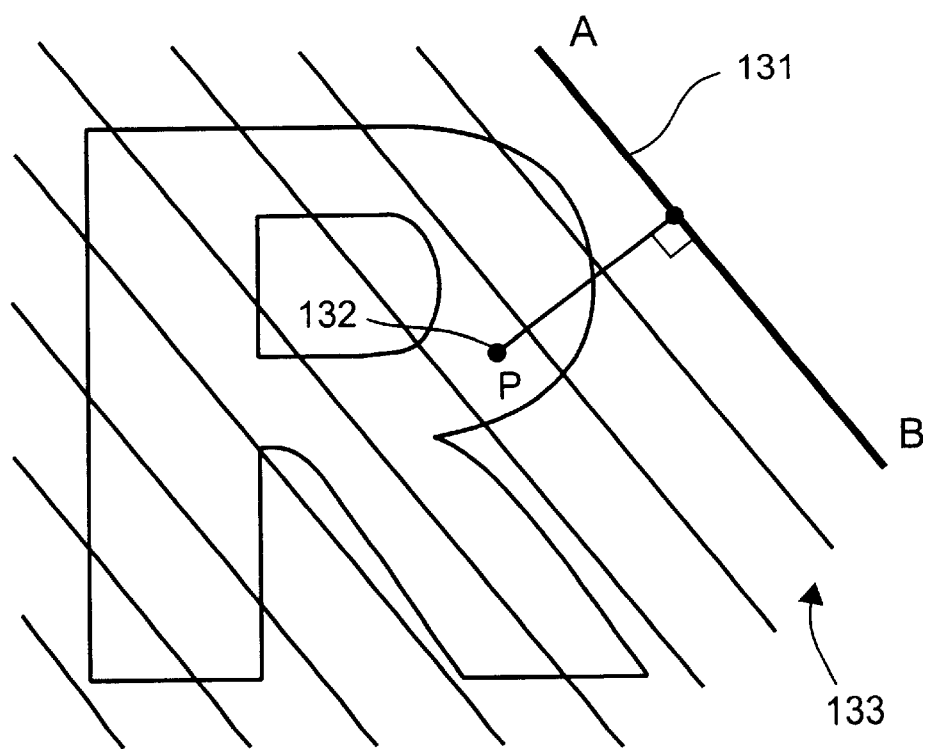
FIG. 13 illustrates the relationship between a point P within the object and an external line.

There is shown in FIG. 12 a packing of circles whose size varies with respect to their proximity to a reference object. The circles in the upper right region 121 have greater radii than those circles in the lower left region 122, with a smooth variation in radii size between these extremes. FIG. 13 illustrates the reference object that results in the size variation shown in FIG. 12, which is the line segment AB 131. Contour lines 133 indicate distance from this reference object, for instance the point P 132 within region R is approximately 2.5 units from AB. In this case, circle radius is decreased according to distance from AB. This size variation is applied in the post-packing step 513. The density of virtual radii of circles does not vary in this case.

Figure 14:
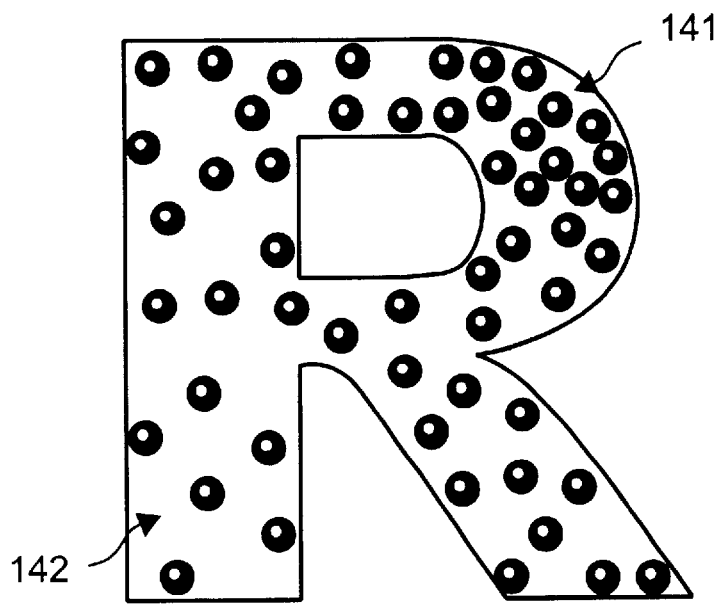
FIG. 14 illustrates density variation dependent on distance from the line.

Turning now to FIG. 14 there is shown a packing of circles whose density varies with respect to their proximity to a reference object. The circles in the upper right region 141 are packed more densely than those circles in the lower left region 142, with a smooth variation in density between these extremes. This density variation is determined during the packing loop steps 506, 507 and 508 of FIG. 5. The reference object used in this case is the same reference object illustrated in FIG. 13.

Figure 15:
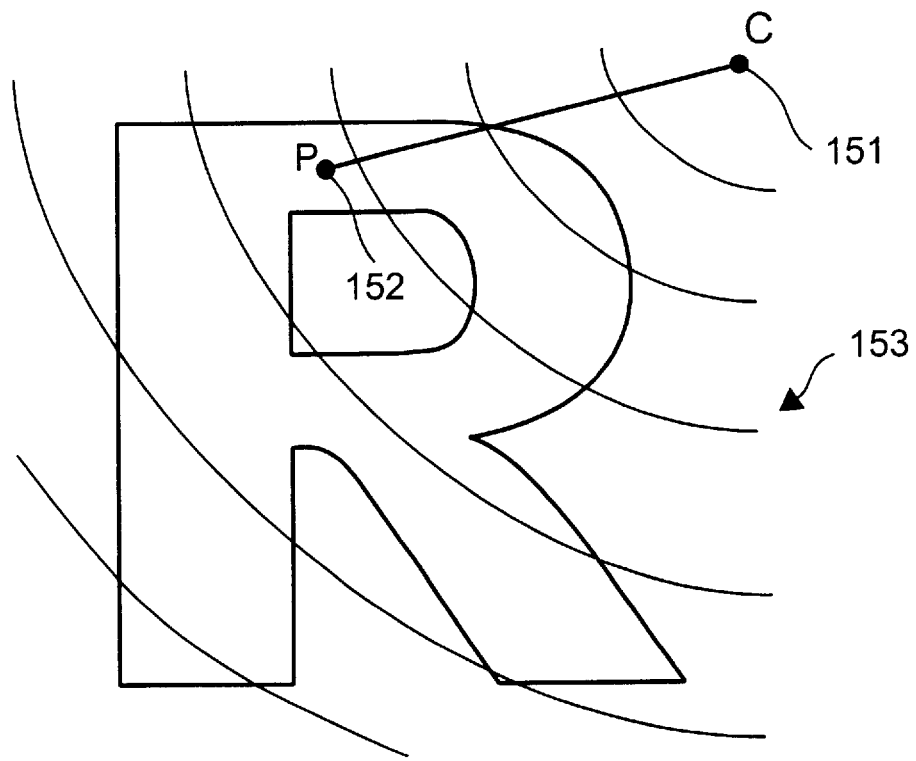
FIG. 15 illustrates the relationship between a point P in the object and an external reference point C.

FIG. 15 illustrates a different type of reference object, the point source reference object C 151. Curved contour lines 153 radiate outwards from C. For instance the point P 152 within region R is approximately 3.3 units from C. Multiple point sources can also be used to give a more complex pattern of variation if desired.

Figure 16:
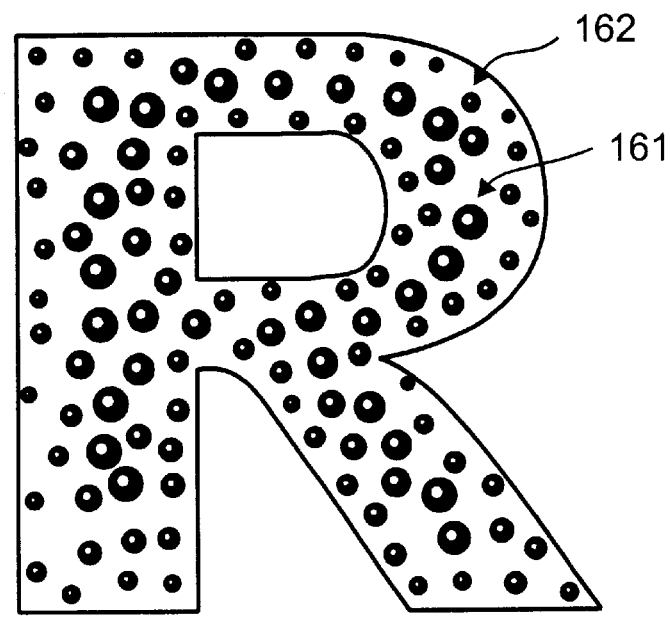
FIG. 16 illustrates a size variation dependent on distance from the MAT.
Figure 17:
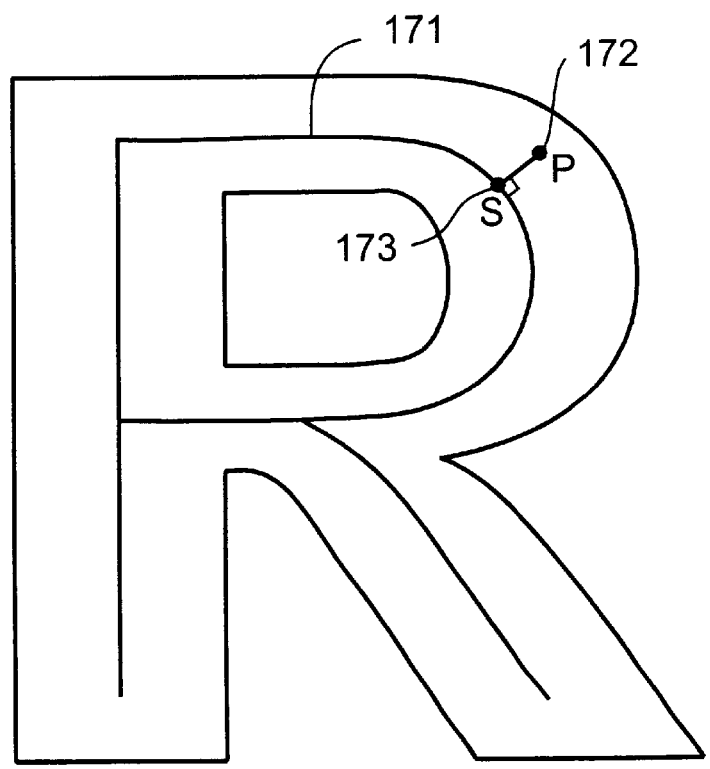
FIG. 17 illustrates the relationship between a point P in the object and the MAT.

There is shown in FIG. 16 a packing of circles whose size varies with respect to their proximity to a reference object, in this case the MAT of region R. The circles towards the centre of the region R 161 have greater radii than those circles towards the boundary 162, with a smooth variation in size between these extremes. FIG. 17 illustrates the reference object that results in the size variation shown in FIG. 16, which is the MAT 171 of region R derived from the EDM. For any point P 172 within region R the closest skeleton point S 173 is found, and the amount of variation is determined by the distance between P and S. This size variation is applied in the post-packing step 513. The density of virtual radii of circles does not vary in this case. Alternatively, if desired, a density variation based on proximity to MAT can be applied during the packing loop steps 506. 507 and 508 of FIG. 5.

Figure 18:
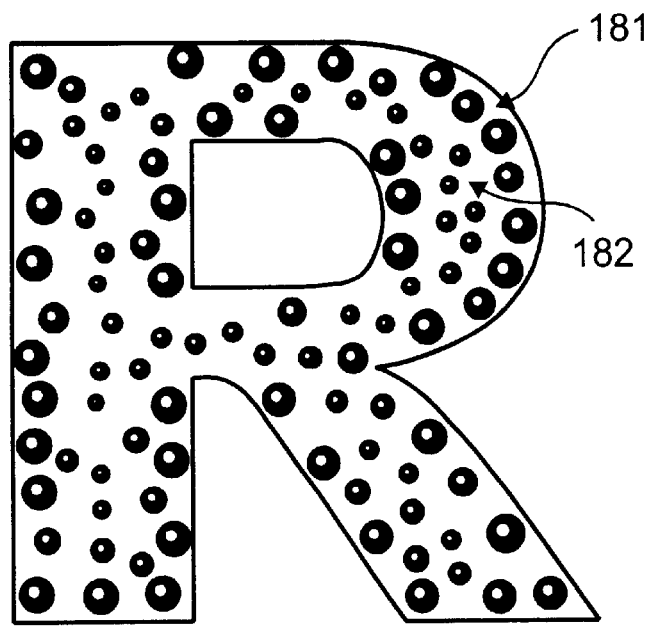
FIG. 18 illustrates a size variation dependent on distance from the boundary.
Figure 19:
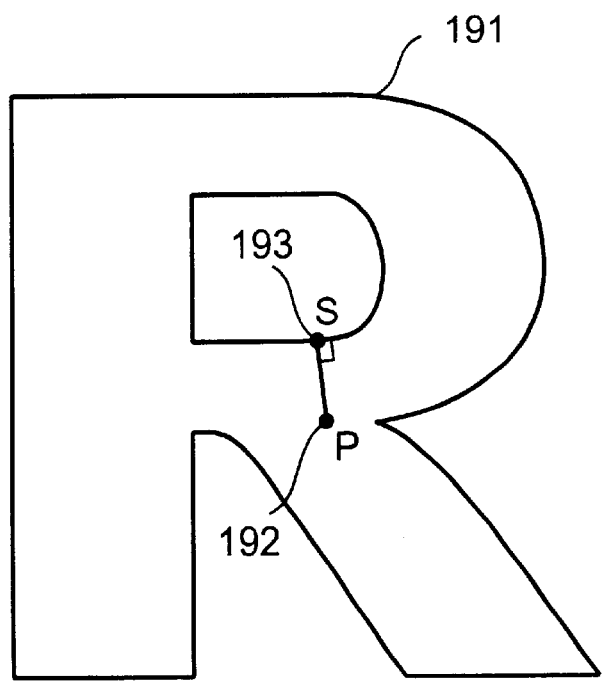
FIG. 19 illustrates the relationship between a point P in the object and the boundary.

FIG. 18 illustrates a packing of circles, the size of which varies with respect to their proximity to a reference object, in this case the boundary. The circles 181 towards the boundary have greater radii than those circles 182 towards the centre of the region R, with a smooth variation in size between these extremes. FIG. 19 illustrates the reference object that results in the size variation shown in FIG. 18, which is the outline or boundary 191. For any point 192 within region R the smallest distance to the boundary 192 can be determined directly from the EDM, effectively giving the distance to the closest point S 193 that lies on the boundary 191, and the amount of variation is determined by this distance. This size variation is applied in the post-packing step 513 of FIG. 5. The density of virtual radii of circles does not vary in this case. Alternatively, density variation based on proximity to the boundary 191 can be applied during the packing loop steps 506, 507 and 508 of FIG. 5.

Figure 20:
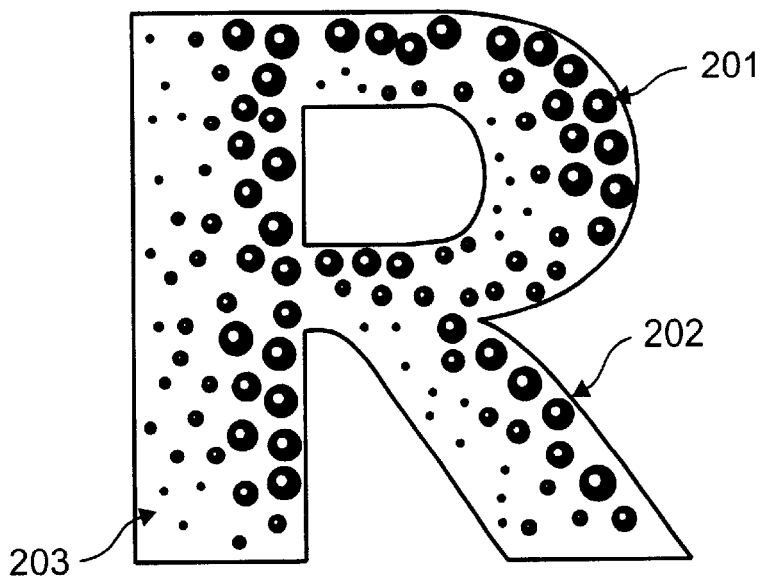
FIG. 20 illustrates a size variation dependent on normal direction.

FIG. 20 illustrates a packing of circles, the size of which varies with respect to their proximity to a reference goal, in this case a preferred direction. The circles 201, 202 are positioned such that their direction to the closest outline point most closely agrees with some preferred direction, have greater radii than those circles 203 positioned such that their direction to the closest outline point least closely agrees with some preferred direction. There is a smooth variation in circle size between these extremes.

Figure 21:
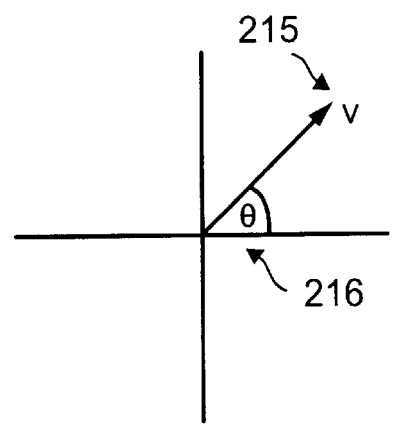
FIG. 21 illustrates the normal at a point P within the object, surface normals at intervals around the boundary, and a reference angle theta.
Figure 21:
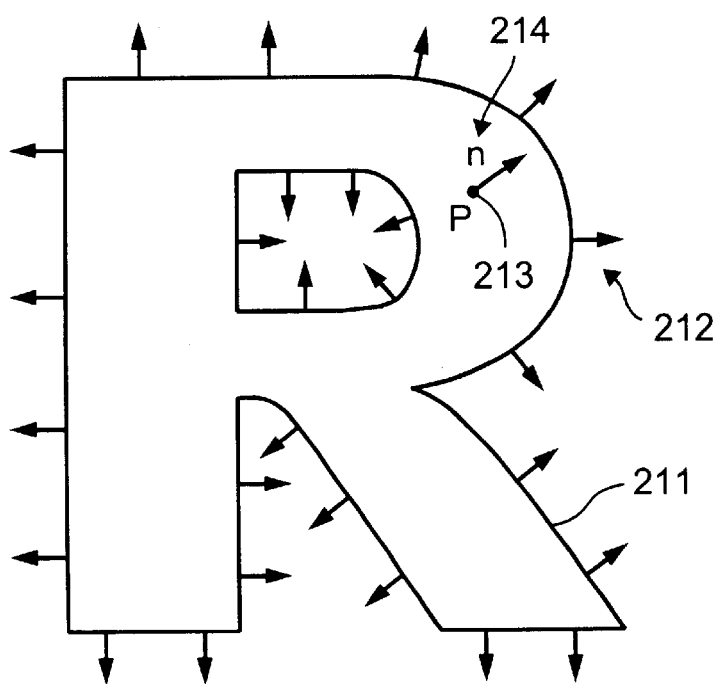

FIG. 21 shows the outline 211 and the outward normals at regular intervals along this curve 212. For any point P 213 within region R the vector n 214 indicating the direction to the closest outline point is determined. This vector is compared for agreement with a preferred vector v 215 derived from an angle theta 216 specified by the user in the pre-packing user input step 502. The dot product of vectors v and n can be used to provide a measure of the agreement between the two vectors, and the amount of variation is determined by the measure of agreement. This size variation is applied in the post-packing step 513. The density of virtual radii of circles does not vary in this case. Alternatively, density variation based on agreement with a preferred direction can be applied during the packing loop steps 506, 507 and 508 of FIG. 5.

Figure 22:
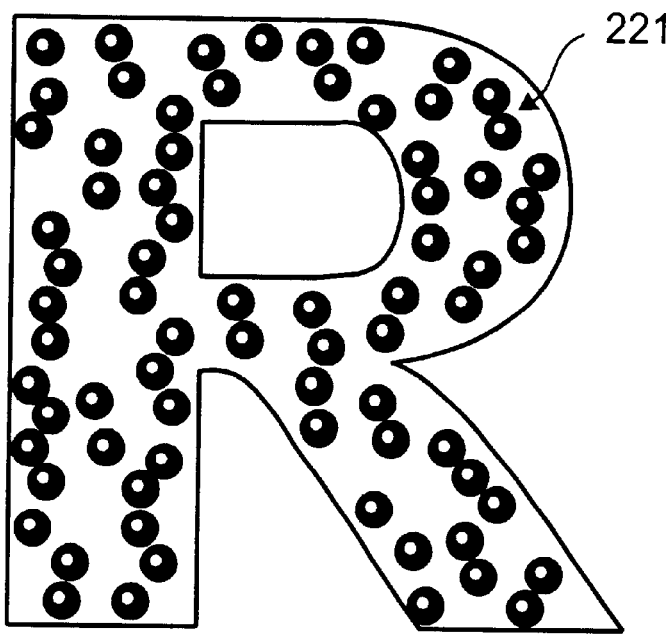
FIG. 22 illustrates a density variation by horizontal compression.
Figure 23:
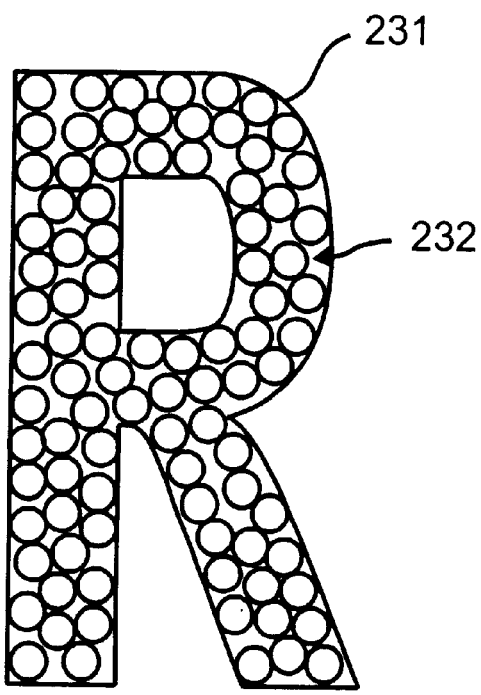
FIG. 23 illustrates circle packing in a horizontally compressed region.

Turning now to FIG. 22, there is shown a circle packing with variation in packing density 221 caused by directional compression. The packed circles are of uniform size, but the packing density varies differently in the horizontal and vertical directions. FIG. 23 illustrates this process, which can be achieved by compressing the outline or boundary 231 horizontally during the pre-packing step 501, performing the packing as described above to result in uniformly packed circles 232, and then decompressing the boundary 231 during the post-packing step 513 of FIG. 5. The circle's centres are repositioned during the decompression stage, resulting in a directionally biased density variation.

Figure 24:
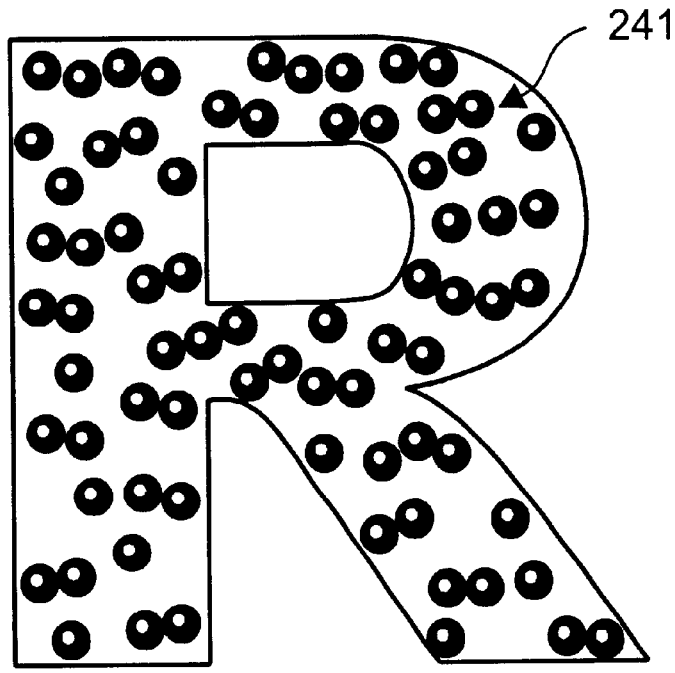
FIG. 24 illustrates a density variation by vertical compression.
Figure 25:
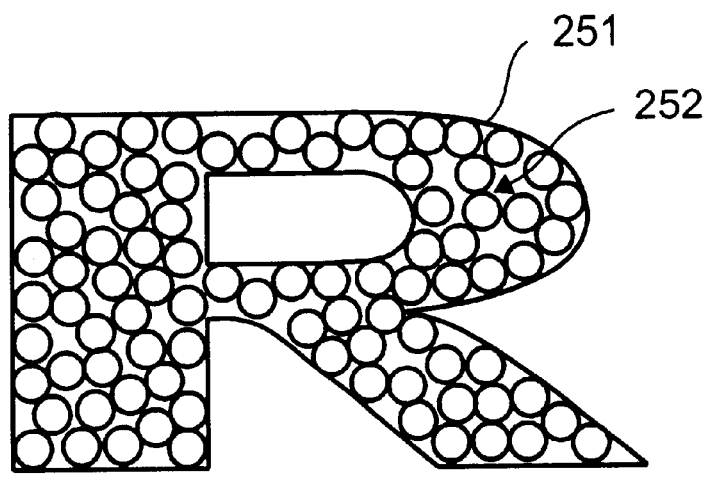
FIG. 25 illustrates circle packing in a vertically compressed region.

FIG. 24 shows a circle packing with variation in packing density 241 caused by directional expansion rather than compression, that is similar to the example of FIGS. 22 and 23 but in another direction. The packed circles are of uniform size, but the packing density varies differently in the horizontal and vertical directions. FIG. 25 illustrates this process, which can be achieved by compressing the outline 251 vertically during the pre-packing step 501, performing the packing as described above to create uniformly distributed circles 252, and then decompressing the outline 251 during the post-packing step 513. The circle's centres are repositioned during the decompression stage, resulting in directionally biased density variation. It will be apparent that compression need not be restricted to the horizontal and vertical directions, and can be applied along any direction.

Figure 26:
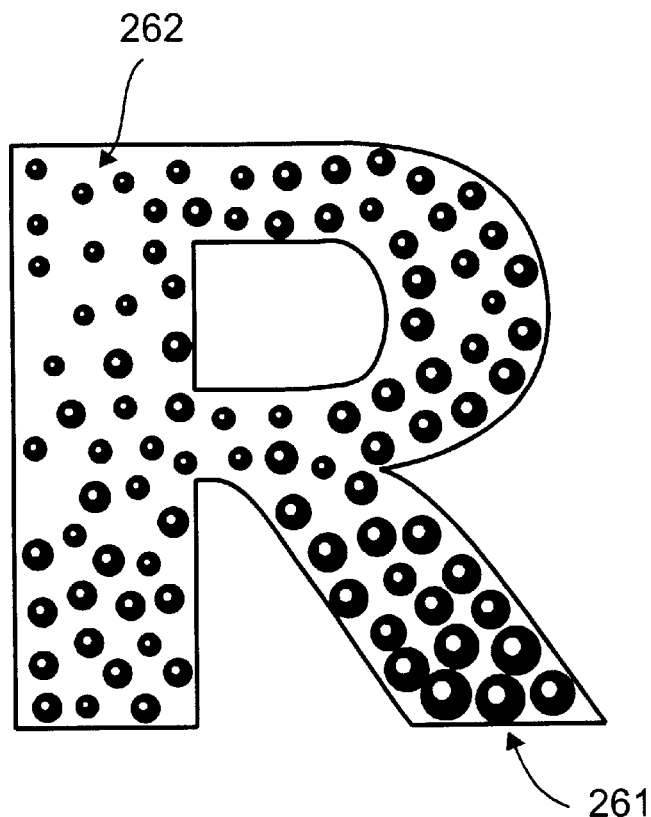
FIG. 26 illustrates a size variation dependent on distance from a reference line.
Figure 27:
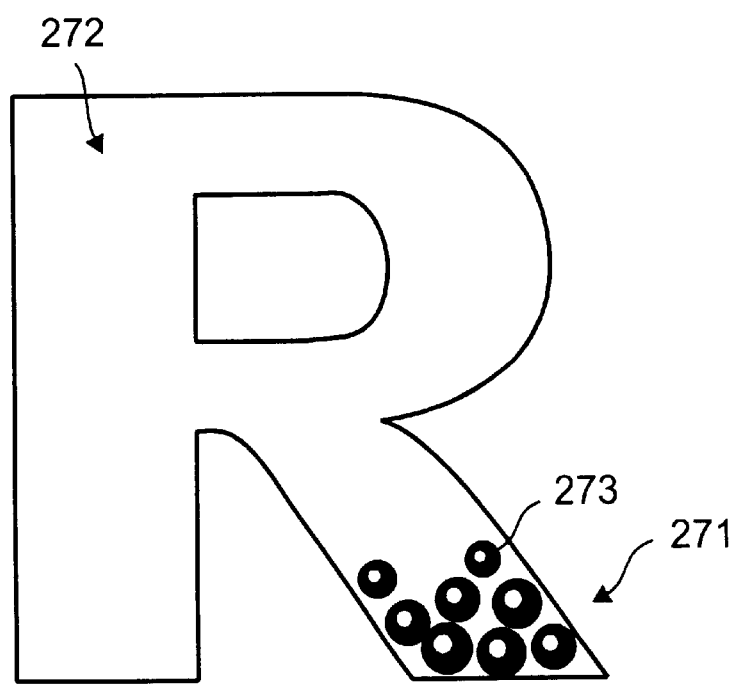
FIG. 27 illustrates a size variation dependent on distance from a reference line with deletion of circles whose radii fall below a threshold.

FIGS. 26 and 27 demonstrate the process of clipping circles whose radii fall below some threshold specified by the user in the user input step 502. FIG. 26 shows a circle packing with size variation such that larger circles occur in the lower right region 261 and smaller circles occur in the top left region 262. FIG. 27 shows the same packing, but with circles below some threshold removed. The threshold in this case is approximately the radius of the smallest circle, 273 in this case. Larger circles are still present in the bottom right region 271, but the top left region 272 is now devoid of circles.

Figure 28:
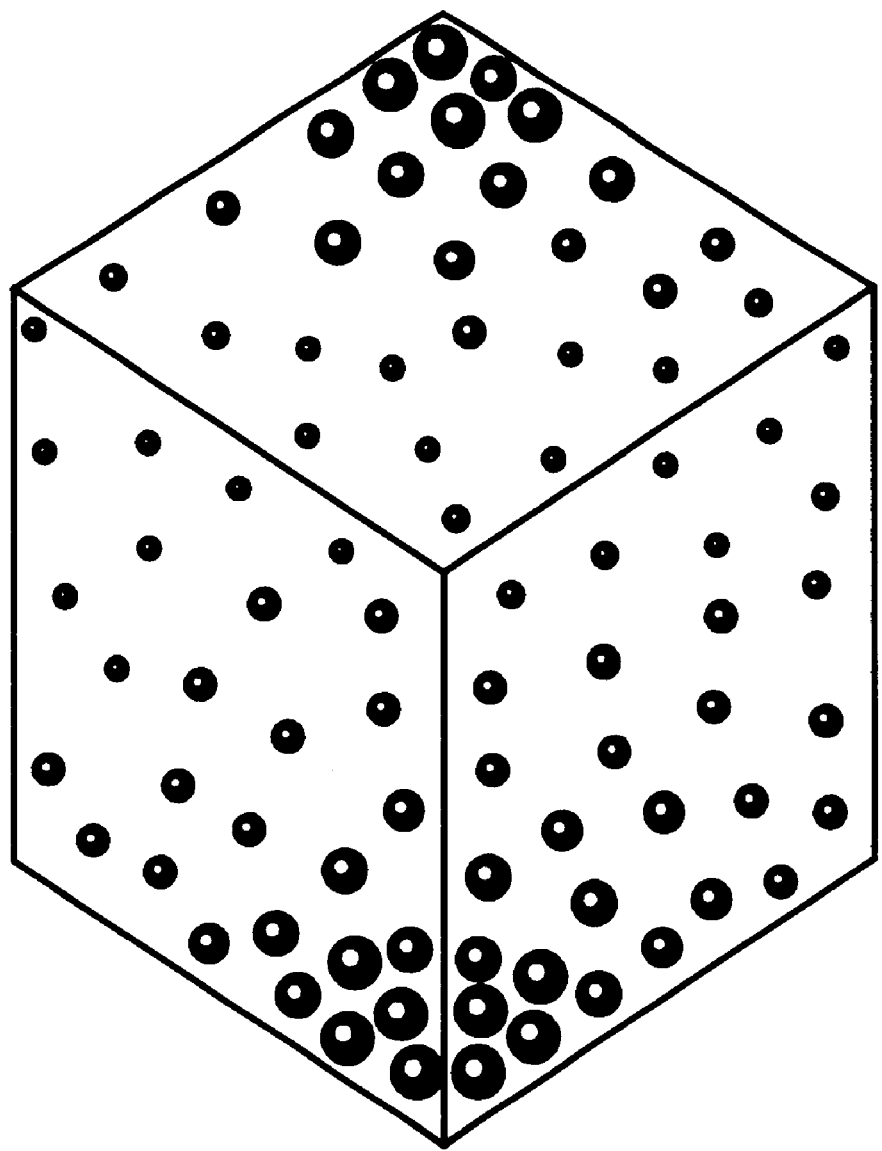
FIG. 28 illustrates the application of the invention to three dimensions.

In FIG. 28 a three dimensional boundary is filled with circles in a manner analogous to that of FIG. 12.

Figure 29:
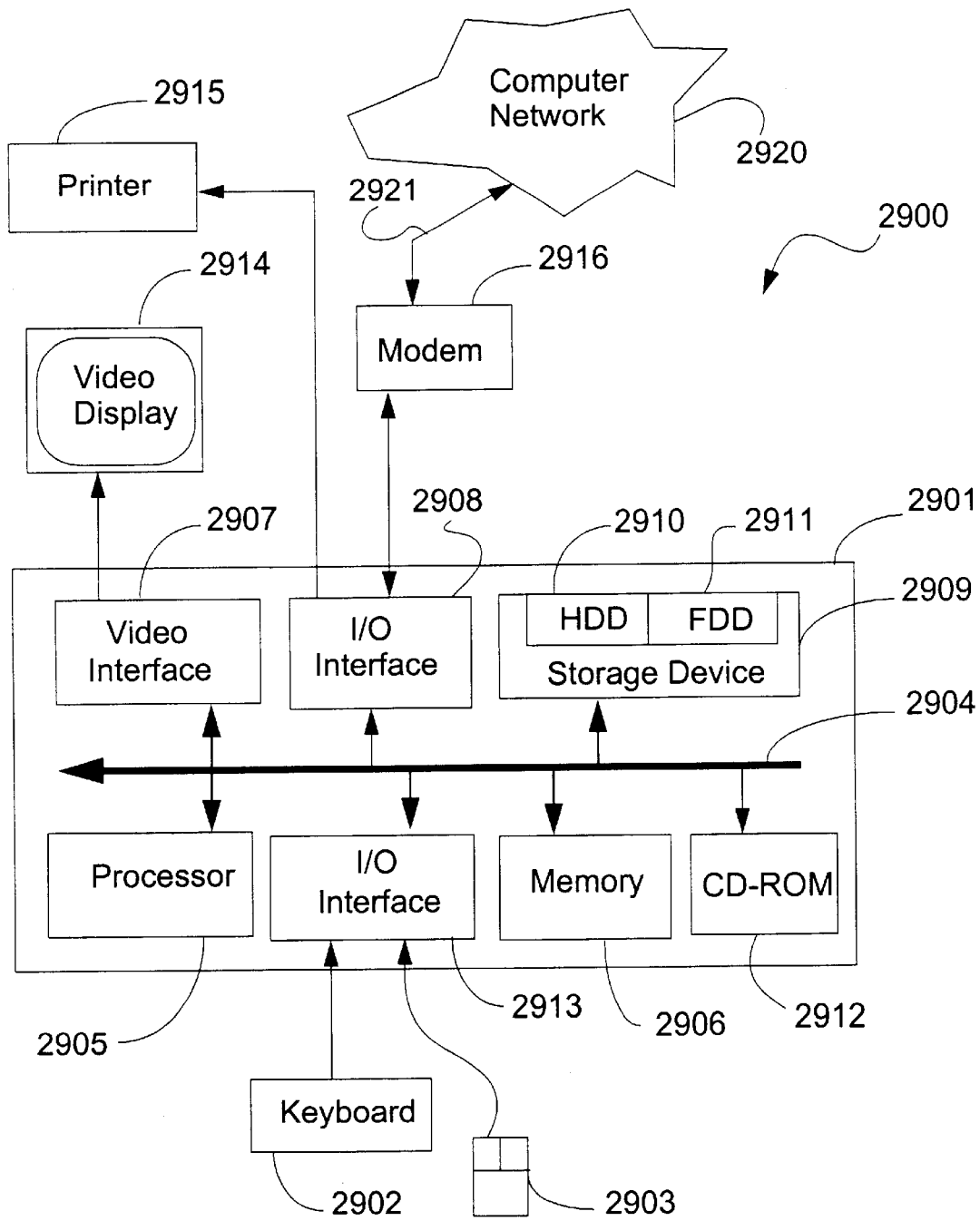
FIG. 29 illustrates a general purpose computer system by means of which an example of the invention can be put into practice.

The method of FIG. 5 is preferably practiced using a conventional general-purpose computer system 2900, such as that shown in FIG. 29 wherein the processes of FIG. 5 may be implemented as software, such as an application program executing within the computer system 2900. In particular, the steps of the method of FIG. 5 are effected by instructions in the software that are carried out by the computer. The software may be divided into two separate parts; one part for carrying out the FIG. 5 methods: and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for providing a user interface in accordance with the embodiments of the invention.

The computer system 2900 comprises a computer module 2901, input devices such as a keyboard 2902 and mouse 2903, output devices including a printer 2915 and a display device 2914. A Modulator-Demodulator (Modem) transceiver device 2916 is used by the computer module 2901 for communicating to and from a communications network 2920, for example connectable via a telephone line 2921 or other functional medium. The modem 116 can be used to obtain access to the Internet, and other network systems, such as a Local Area Network (LAN) or a Wide Area Network (WAN).

The computer module 2901 typically includes at least one processor unit 2905. a memory unit 2906, for example formed from semiconductor random access memory (RAM) and read only memory (ROM), input/output (I/O) interfaces including a video interface 2907, and an I/O interface 2913 for the keyboard 2902 and mouse 2903 and optionally a joystick (not illustrated), and an interface 2908 for the modem 2916. A storage device 2909 is provided and typically includes a hard disk drive 2910 and a floppy disk drive 2911. A magnetic tape drive (not illustrated) may also be used. A CD-ROM drive 2912 is typically provided as a non-volatile source of data. The components 2905 to 2913 of the computer module 2901, typically communicate via an interconnected bus 2904 and in a manner which results in a conventional mode of operation of the computer system 2900 known to those in the relevant art. Examples of computers on which the embodiments can be practised include IBM-PC's and compatibles. Sun Sparcstations or alike computer systems evolved therefrom.

Typically, the application program of the preferred embodiment is resident on the hard disk drive 2910 and read and controlled in its execution by the processor 2905. Intermediate storage of the program and any data fetched from the network 2920 may be accomplished using the semiconductor memory 2906, possibly in concert with the hard disk drive 2910. In some instances, the application program may be supplied to the user encoded on a CD-ROM or floppy disk and read via the corresponding drive 2912 or 2911, or alternatively may be read by the user from the network 2920 via the modem device 2916. Still further, the software can also be loaded into the computer system 2900 from other computer readable medium including magnetic tape, a ROM or integrated circuit, a magneto-optical disk, a radio or infra-red transmission channel between the computer module 2901 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of providing a user interface may alternatively be implemented in dedicated hardware such as one or more integrated circuits performing the functions or sub functions of FIG. 5. Such dedicated hardware may include graphic processors, digital signal processors, or one or more microprocessors and associated memories.

Industrial Applicability

It is apparent from the above that the embodiment(s) of the invention are applicable to the computer graphics industry and to the font generation aspects thereof, in particular.

The foregoing describes only some embodiments of the present invention, and modifications and/or changes can be made thereto without departing from the scope and spirit of the invention, the embodiment being illustrative and not restrictive.

In the context of this specification, the word "comprising" means "including principally but not necessarily solely" or "having" or "including" and not "consisting only of". Variations of the word comprising, such as "comprise" and "comprises" have corresponding meanings.

The forgoing describes only some embodiments of the present invention and modifications, obvious to those skilled in the art, that can be made thereto without departing from the scope of the present invention. For example, although circles have been described in detail as the sub-images, the use of apparent dimensions enables other images to be located at the centre of the "circle" determined by the virtual radius.

We claim:

1. A method of packing a plurality of sub-images within a bounded image, said method comprising the steps of:
   1) defining a boundary for the image;
   2) specifying parameters that affect at least one of packing density and size of each sub-image, wherein the parameters vary as a function of position;
   3) providing each sub-image with an actual dimension and a virtual dimension;
   4) packing the sub-images within the boundary in accordance with the parameters, wherein the spacing between the sub-images is determined by the virtual dimension such that each sub-image touches, but does not intersect, at least one neighboring sub-images; and
   5) converting the virtual dimension to the actual dimension for each sub-image.

2. A method as claimed in claim 1, including the step of providing each sub-image with a substantially similar appearance.

3. A method as claimed in claim 1, wherein the size of the packed sub-images varies with distance from a reference object.

4. A method as claimed in claim 1, including the steps of maintaining spatially uniform size of each sub-image within the boundary.

5. A method as claimed in claim 1, wherein the packing density of the packed sub-images varies with distance from a reference object.

6. A method as claimed in claim 1, including the step of making the actual dimension exceed the virtual dimension.

7. A method as claimed in claim 6, including the step of making the actual dimension exceed the virtual dimension sufficiently for the sub-images to overlap at least partially.

8. A method as claimed in claim 1, including the step of making the actual dimension less than the virtual dimension, whereby the sub-images appear spaced apart.

9. A method as claimed in claim 1, wherein the actual dimension varies as a function of distance from a reference object.

10. A method as claimed in claim 9, including the step of displaying only those of the sub-images which exceed a predetermined threshold size.

11. A method as claimed in claim 1, including the step of making each sub-image substantially circular, whereby the actual and virtual dimensions comprise radii.

12. Apparatus for packing a plurality of sub-images within a bounded image, said apparatus comprising:
    means for defining a boundary for the image,
    means for specifying parameters for each sub-image, the parameters affecting at least one of packing density and size and varying as a function of position, means for packing the sub-images within the boundary in accordance with the parameters, wherein said means for packing sub-images creates each of the sub-images with an actual dimension and a virtual dimension and determines the spacing between the sub-images in accordance with the virtual dimension such that each sub-image touches but does not intersect, at least one neighboring sub-image; and means for converting the virtual dimension to the actual dimension for each sub-image.

13. The apparatus as claimed in claim 12, further comprising means for providing each sub-image with a substantially similar appearance.

14. The apparatus as claimed in claim 12, wherein the size of the packed sub-images varies with distance from a reference object.

15. The apparatus as claimed in claim 12, further comprising means for maintaining a spatially uniform size for each sub-image within the boundary.

16. The apparatus as claimed in claim 12, wherein the packing density of the packed sub-images varies with distance from a reference object.

17. The apparatus as claimed in claim 12, wherein said means for packing sub-images creates the actual dimension greater than the virtual dimension.

18. The apparatus as claimed in claim 17, wherein the actual dimension exceeds the virtual dimension sufficiently for the sub-images to overlap at least partially.

19. The apparatus as claimed in claim 12, wherein said means for packing sub-images creates the actual dimension less than the virtual dimension whereby, the sub-images are spaced apart.

20. The apparatus as claimed in claim 12, wherein the actual dimension varies as a function of distance from a reference object.

21. The apparatus as claimed in claim 20, wherein a threshold means connected with said means for packing sub-images permits only those sub-images which exceed a predetermined threshold size to be displayed.

22. The apparatus as claimed in claim 12, wherein the sub-images are circular and the actual and virtual dimensions comprise radii.

23. A computer program product for packing a plurality of sub-images within a bounded image, said product comprising:

means for defining a boundary for the image, means for specifying parameters for each of the sub-images, the parameters affecting at least one of packing density and size and varying as a function of position, means for packing the sub-images within the boundary in accordance with the parameters, wherein said means for packing sub-images creates each of the sub-images with an actual dimension and a virtual dimension and determines the spacing between the sub-images in accordance with the virtual dimension such that each sub-image touches, but does not intersect, at least one neighboring sub-image; and means for converting the virtual dimension to the actual dimension for each sub-image.

24. The product as claimed in claim 23, further comprising means for providing each of the sub-images with a substantially similar appearance.

25. The product as claimed in claim 23, wherein the size of the packed sub-images varies with distance from a reference object.

26. The product as claimed in claim 23, further comprising means for maintaining a spatially uniform size for each sub-image within the boundary.

27. The product as claimed in claim 23, wherein the packing density of the packed sub-images varies with distance from a reference object.

28. The product as claimed in claim 23, wherein said means for packing sub-images creates the actual dimension greater than the virtual dimension.

29. The product as claimed in claim 28, wherein the actual dimension exceeds the virtual dimension sufficiently for the sub-images to overlap at least partially.

30. The product as claimed in claim 23, wherein said means for packing sub-images creates the actual dimension less than the virtual dimension whereby the sub-images are spaced apart.

31. The product as claimed in claim 23, wherein said means for packing sub-images varies the actual dimension within the boundary as a function of distance from a reference object.

32. The product as claimed in claim 31, wherein a threshold means connected with said means for packing sub-images permits only those sub-images which exceed a predetermined threshold size to be displayed.

33. The product as claimed in claim 23, wherein the sub-images are circular and the actual and virtual dimensions comprise radii.

34. A bounded image having a plurality of sub-images, and being formed by the method of claim 1, or by the apparatus of claim 12, or by the computer program product of claim 23.

35. A method as claimed in claim 1, wherein the boundary defined for the image is a character outline.

36. A method as claimed in claim 1, further comprising the step of displaying the bounded image.

* * * * *

UNITED STATES PATENT AND TRADEMARK OFFICE
CERTIFICATE OF CORRECTION

PATENT NO. : 6,822,652 B1
APPLICATION NO. : 09/384432
DATED : November 23, 2004
INVENTOR(S) : Cameron Bolitho Browne et al.

It is certified that error appears in the above-identified patent and that said Letters Patent is hereby corrected as shown below:

<u>Title page,</u>
Insert Item -- [*] Notice:  This patent issued on a continued prosecution application filed under 37 CFR 1.53(d), and is subject to the twenty year patent term provisions of 35 U.S.C. § 154(a)(2). --.
Item [56], References Cited, OTHER PUBLICATIONS,
"IBM Technical Disclosure" reference, "Dec. 12, 1991," should read -- Dec. 1, 1999, --.
Item [57], ABSTRACT,
Line 4, "(eg" should read -- (e.g. --; and <u>Column 1,</u>
Line 24, "eg" should read -- e.g. --; and
Line 41, "ie" should read -- i.e., --.

<u>Column 4,</u>
Line 3, "in" should be deleted;
Line 7, "defies" should read -- defines --; and
Line 29, "1 tangent" should read -- 1-tangent --.

<u>Column 5,</u>
Line 29, "packing" should read -- packing, --.

<u>Column 6,</u>
Line 54, "packings" should read -- packing --.

<u>Column 7,</u>
Line 35, "506. 507 and" should read -- 506, 507 and --.

<u>Column 9,</u>
Line 30, "practised" should read -- practiced --.

<u>Column 10,</u>
Line 29, "sub-images;" should read -- sub-image; --;
Line 64, "image," should read -- images; --; and
Line 67, "position," should read -- position; --.

UNITED STATES PATENT AND TRADEMARK OFFICE
CERTIFICATE OF CORRECTION

PATENT NO. : 6,822,652 B1
APPLICATION NO. : 09/384432
DATED : November 23, 2004
INVENTOR(S) : Cameron Bolitho Browne et al.

It is certified that error appears in the above-identified patent and that said Letters Patent is hereby corrected as shown below:

<u>Column 11,</u>
Line 46, "image," should read -- image; --; and
Line 49, "position," should read -- position; --.

Signed and Sealed this

Twenty-seventh Day of June, 2006

JON W. DUDAS
*Director of the United States Patent and Trademark Office*